United States Patent [19]

Le Grand

[11] 4,418,245
[45] Nov. 29, 1983

[54] INTERFERENCE LIMITING TWO-PORT NETWORK FOR 1+1 TYPE TRANSMISSION SYSTEMS

[75] Inventor: Yves-Marie Le Grand, Trappes, France

[73] Assignee: Compagnie Industrielle des Telecommunications Cit-Alcatel, Paris, France

[21] Appl. No.: 351,079

[22] Filed: Feb. 22, 1982

[30] Foreign Application Priority Data

Nov. 13, 1981 [FR] France ................................ 81 21314

[51] Int. Cl.³ ............................................. H04J 1/00
[52] U.S. Cl. ..................................... 179/2.51; 370/72
[58] Field of Search ........................... 179/2.51, 170 C; 370/71, 72, 76

[56] References Cited

U.S. PATENT DOCUMENTS 4,210,779 7/1980 Simokat .............................. 179/2.51

FOREIGN PATENT DOCUMENTS 1348141 3/1974 United Kingdom ................. 370/71
1411089 10/1975 United Kingdom ................. 370/71

*Primary Examiner*—G. Z. Rubinson
*Assistant Examiner*—W. J. Brady
*Attorney, Agent, or Firm*—Sughrue, Mion, Zinn, Macpeak and Seas

[57] ABSTRACT

The present invention relates to 1+1 type carrier telephone transmission systems for connecting two subscriber terminals to a telephone exchange via a common two-wire link, one of the terminals being connected via the conventional audio channel, and the other terminal being connected by a channel referred to as a super-audio channel. Disturbances caused in the super-audio channel by signalling, dialling and calling signals of the audio channel are reduced by inserting a current-limiting two-port network in series in the audio channel and at the exchange end of the 1+1 system, in between the filter which separates out the audio channel and the rest of the exchange. Advantageously, an interference limiting low-pass filter (50) is also placed in series on the audio circuit. It has a capacitive shunt arm with a mid point connected to exchange battery ground.

4 Claims, 3 Drawing Figures

INTERFERENCE LIMITING TWO-PORT NETWORK FOR 1+1 TYPE TRANSMISSION SYSTEMS

The present invention relates to telephone transmission and in particular to 1+1 type subscriber carrier systems.

BACKGROUND OF THE INVENTION

1+1 systems allow two subscriber terminals to be connected to a telephone exchange by a common two-wire link. One of the terminals is conventionally connected, using an audio telephone channel with two-way transmission over the base band on the common two-wire link. It is remote powered by the exchange battery via the common two-wire link. The other terminal is linked by carrier currents. Each transmission direction of its "super-audio" channel is transmitted over the common two-wire link via separate frequency-transposed bands. Said other terminal may likewise be remote supplied from the exchange battery via the common two-wire link. The super-audio transmissions are superimposed on the common two-wire link or separated therefrom, as the case may be at each end of said link by means of respective filter circuits, each of which comprises a low-pass filter connecting the common two-wire link to an audio-only, two wire line, and two band pass filters connecting the common two-wire link to a four-wire line on which the two directions of the super-audio channel are isolated.

There is a relatively high degree of interference on the super-audio channel when the audio channel is being used for dialling or signalling and the super-audio channel is thereby prevented from operating properly for data transmission.

Preferred embodiments of the invention limit the interference generated on the super-audio channel by dialling, signalling or calling signals being transmitted over the audio channel on the common two-wire link, thereby enabling the super-audio channel to be used for data transmission.

This can be done simply, efficiently and at low cost.

SUMMARY OF THE INVENTION

The present invention provides an interference-limiting two-port network for use in a 1+1 type transmission system connecting two subscriber terminals via a common two-wire link to a telephone exchange provided with an exchange battery, one of the subscriber terminals being connected via a channel referred to as an audio channel using base band transmission over the common two-wire link and being remotely powered by the exchange battery via said two-wire link, the other subscriber terminal being connected via a channel referred to as a super-audio channel using frequency transposed bands for transmission over the common two-wire link, the audio and super-audio channels being superimposed on the common two-wire link and being separated at the ends of said link by separation filters, each of which includes a low pass filter connecting the common two-wire link to a two-wire line on which the audio channel is isolated, wherein said interference-limiting two-port network is located at the exchange end of the system and comprises two current limiter circuits, each placed in series in a respective one of the two wires of the two-wire line of the audio channel in between the low pass filter of the exchange end separation filter and the rest of the exchange.

Preferably, the two port network includes a low-pass filter which is disposed between the current limiters and the low-pass filter of the filter separation circuit, which two port network low pass filter has a capacitor branch connected in shunt across the two wires of the two-wire line with a mid point of said capacitor branch connected to the ground terminal of the exchange battery which remote supplies the subscriber terminal connected via the audio channel.

In a particular embodiment of the invention, the two current limiter circuits are identical DC limiters each shunted by a by-pass diode connected to conduct in the opposite direction to its associated current limiter.

BRIEF DESCRIPTION OF THE DRAWINGS

An embodiment of the invention is described by way of example with reference to the accompanying drawings in which.

MORE DETAILED DESCRIPTION

Figure 1:
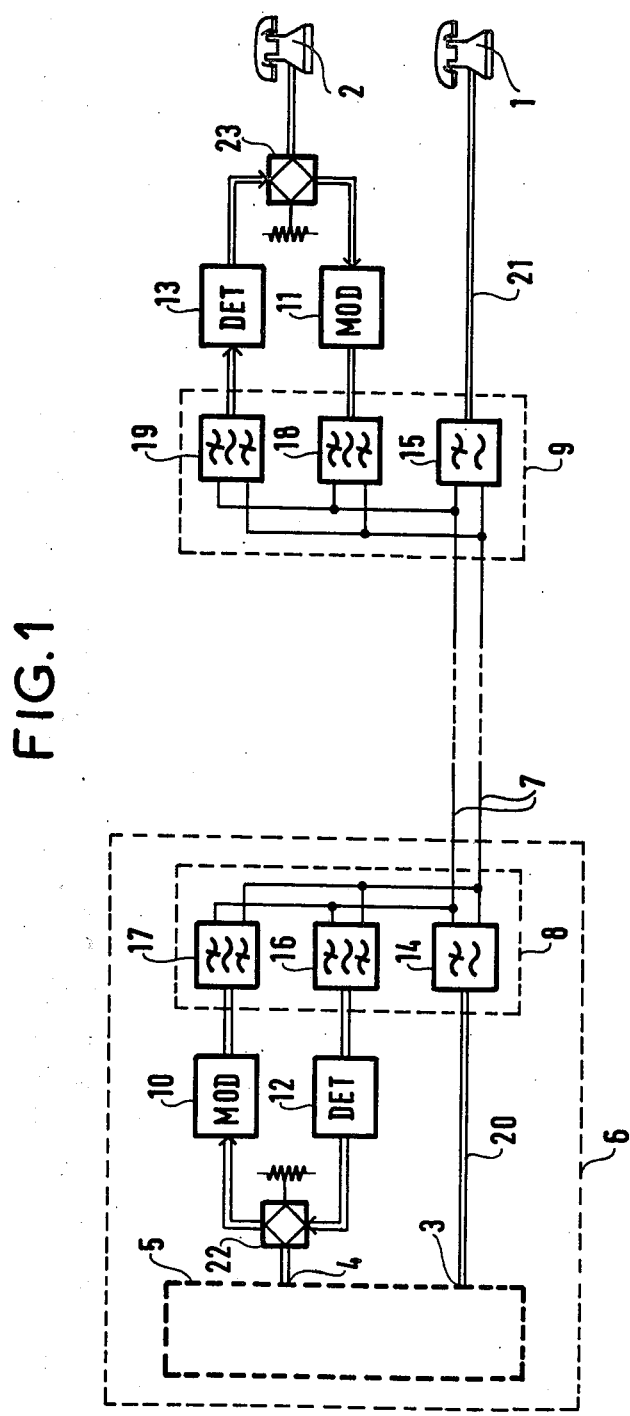
FIG. 1 is a block diagram of 1+1 type telephone transmission system.

Two subscribers' terminals referenced 1 and 2 are shown in FIG. 1. They are connected to distinct two-way accesses 3, 4 of a junctor 5 of a telephone exchange 6 via a common two-wire link 7 by means of a carrier current transmission system of the 1+1 type which frequency multiplexes the telephone channels of the subscriber terminals 1 and 2.

The conversation, dialling, signalling and calling signals exchanged between the two-way access 3 of the exchange junctor and the subscriber terminal 1 are transmitted without modification over the common two-wire link 7 which, for the subscriber terminal 1, acts like an ordinary two-wire line. The signals exchanged between the two-way access 4 of the exchange junctor and the subscriber's terminal 2 are frequency transposed into a frequency band around 24 Khz in one direction and around 48 Khz in the other direction before being conveyed over the common two-wire link 7. Dialling signalling and calling signals exchanged between the exchange and the subscriber's terminal 2 are conveyed to the common two-wire link via 24-Khz and 48-Khz carriers.

The telephone channel of subscriber's terminal 1 is transmitted in the 300–3,400 Hz base band and for convenience' sake is referred to herein as an audio channel while the telephone channel of subscriber's terminal 2 is referred to as a super-audio channel.

The 1+1 type telephone transmission system has filter separation circuits 8 and 9 at its ends to superimpose and separate the audio and super audio channels in the common two-wire link 7, together with modulators 10, 11 and detectors 12, 13 for modulation and detection in each transmission direction of the super audio channel, and additional apparatus (not shown) to process the dialling, signalling and calling signals exchanged between the exchange and the subscriber's terminal 2.

The filter separation circuits 8 and 9 are equipped with respective low-pass filters 14 and 15 to insert the audio channel onto the common two-wire link and to extract it therefrom. They are also each equipped with a pair of band-pass filters 16 and 17 or 18 and 19 respectively to insert the super-audio channel onto the common two-wire link and to extract it therefrom. One band-pass filter of each pair is centred 24 Khz in frequency while the other is centred on 48 Khz.

The audio channel is continuously present on the two wires. It uses a first two-wire line 20 which links the junctor access 3 to the low-pass filter 14 of the separation filter 8, then the common two-wire link 7 which links the separation filters 8 and 9 and lastly a second two-wire link 21 which links the low-pass filter 15 of the separation filter 9 to the subscriber's terminal 1. Such continuous presence on two wires enables the subscriber's terminal 1 to be remote supplied at a constant voltage by the exchange battery as is normal for subscribers' terminals connected to an exchange by individual two-wire lines.

The two directions of the super audio channel are conveyed separately either on four-wire lines when they are in base band or else in different frequency bands when they are frequency transposed.

Signals coming from the two-way junctor access 4 and sent to subscriber's terminal 2 are firstly separated from signals being sent in the opposite direction by a hybrid circuit 22, then they are applied to the common two-way link 7 via the modulator 10 which transposes them into a frequency band centred on 48 Khz and via the band pass filter 17 which is centred on said frequency and which removes unwanted signal components from the modulator. Said signals are then extracted at the other end of the common two-wire link 7 by the band pass filter 19 which is likewise centred on 48 Khz; they are the re-transposed to base band by the detector 13 and mixed with the signals travelling in the opposite direction by a hybrid circuit 23 before being applied to the subscriber's terminal 2 by a two-wire line.

Signals coming from the subscriber's terminal 2 and going to the two-way junctor access 4 are firstly separated from the signals going in the opposite direction by the hybrid circuit 23 and are then applied to the common two-wire link 7 via the modulator 11 which transposes them into a frequency band centred on 24 kHz and via the band pass filter 18 which is centred on said frequency and which removes unwanted modulation components. Said signals are extracted at the other end of the common two-wire link 7 by the band pass filter 16 centred on 24 Khz, they are then retransposed to base band by the detector 12 and mixed with the signals of opposite direction by the hybrid circuit 22 before being applied to the two-way junctor access 4.

The units of the 1+1 type transmission system which are installed at the exchange end of the common two-wire link 7 are grouped together and powered by the exchange battery. Those mounted at the subscriber end of the common two-wire link 7 are not necessarily grouped as illustrated in the figure: the low-pass filter 15 may advantageously be placed at the end of the common two-wire link 7, with the rest of the 1+1 system units being grouped together near the subscriber's terminal 2. Generally these units are powered by a local power supply, but sometimes they are powered by a remote supply trickle current from the exchange battery, said remote supply current flowing along the common two-wire link 7.

Figure 2:
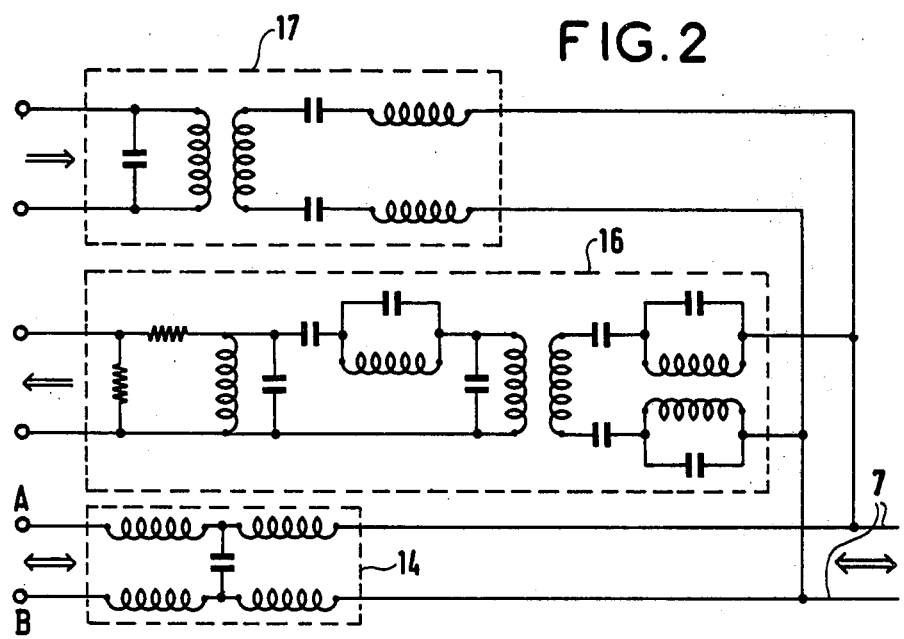
FIG. 2 illustrates in detail a separation filter used in a 1+1 type telephone transmission system.

FIG. 2 shows in detail the constitution of the filters 14, 16, 17 of the separation filter 8. With such a structure, the signalling, dialling and calling signals of the audio channel (which are generated by battery reversals or loop-disconnect switching) produce very intense parasitic oscillations in the band pass filters for separating out the super audio channel. This completely disturbs units operating at low levels, e.g. data transmission modems.

Figure 3:
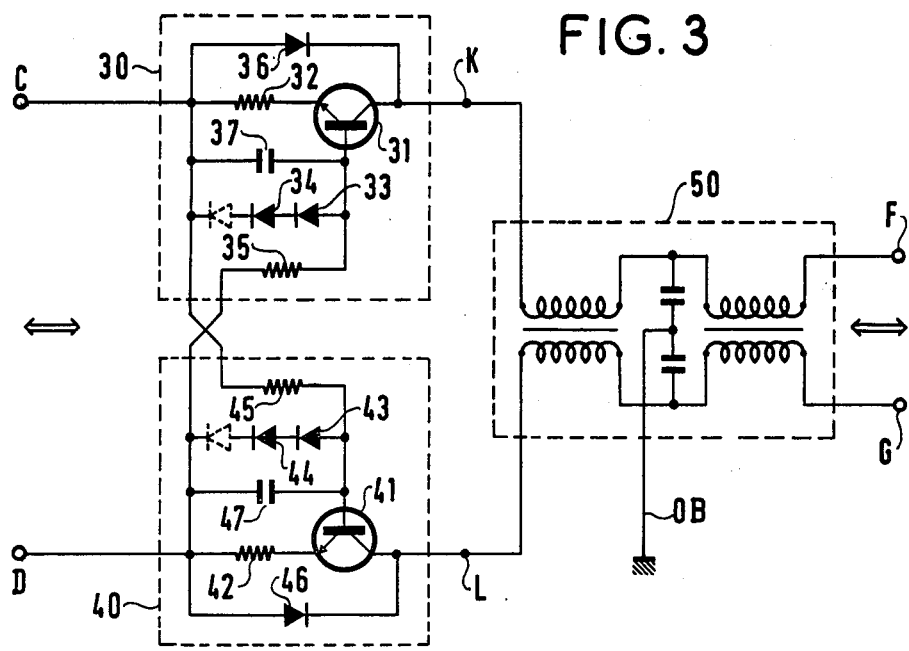
FIG. 3 is a circuit diagram of an interference limiting two port network in accordance with the invention.

To suppress these disturbances, an interference limiting two-port network whose structure is illustrated in FIG. 3 is inserted in the audio channel in between A and B terminals of the low-pass filter 14, and the end of the two-wire line 20 coming from the junctor access 3. Said two-port network has two 2-wire ports, one port C, D being designed for connection to the 2-wire line 20 (FIG. 1) and the other port F, G designed for connection to the A and B terminals (FIG. 2) of the low-pass filter 14. The main components of the two-port network are two current limiters 30 and 40 placed in series with respective ones of the terminals of the low-pass filter 14, together with an extra low-pass filter 50 inserted between the current limiters 30 and 40 and the A and B terminals of the low pass filter 14.

The two current limiters 30 and 40 come into action during signalling where they replace the conventional constant voltage remote power supply which the exchange battery normally constitutes by a constant-current remote power supply which limits disturbing current peaks. The current limiters 30 and 40 are identical and together they form a first two-port sub-network having wires C and D as one port in common with the two-port network as a whole and wires K and L as the other port which is connected to the low-pass filter 50. Each of the current limiters has an NPN ballast transistor 31 (or 41) which is connected as a current generator. The ballast transistors 31 (or 41) have low-value emitter resistors 32 (42) each having a base bias circuit formed by a chain of diodes 33 and 34 (43 and 44), disposed to conduct in the same direction as the base-emitter junction and connected in parallel with the series circuit constituted by said junction and the emitter resistor 32 (or 42). Each of the current limiters further includes a bias resistor 35 (45) for biasing the chain of diodes and having one end connected to the base of the transistor 31 (41). A by-pass diode 36 (46) is shunt connected around the series-connected circuit formed by the emitter-resistor and the emitter-collector junction of the ballast transistor 31 (41) to conduct in the opposite direction to said emitter-collector junction thereby protecting the transistor 31 (41) against reverse voltages. A decoupling capacitor 37 (47) is connected in parallel with the chain of diodes to provide AC decoupling of the transistor base. The series circuit formed by the emitter resistor 32 (42) and the emitter-collector junction of the transistor 31 (41) connects the port terminals C to K (or D to L), while the free ends of the bias resistors 35 and 45 are cross-connected to the access terminals D or C of the other current limiter.

One of the wires of the junctor access 3 reserved for the subscriber terminals 1 connected by the audio channel is usually connected to exchange battery ground OB while the other is usually connected to the −48 volt potential of said battery. Said polarity is reversed in some cases, e.g. to indicate whether a call should be charged or not.

When ground OB is applied to the terminal C and the −48 volt potential is applied to the terminal D, the current limiter 30 is inhibited and by-passed by its by-pass diode 36 while the current limiter 40 imposes its current-limiting effect and its by-pass diode 46 is inhibited. In these circumstances, the ballast transistor 31 of the current limiter 30 is inhibited by its base-emitter junction being reverse biassed due to the application of the −48 volt potential to the end of its bias resistor 35 and of the 0 volt potential to the end of its emitter resistor 32. The by-pass diode 36 is enabled since it is forward biassed. The ballast transistor 41 of the current limiter 40 is enabled since its base-emitter junction is forward biassed due to the application of the −48 volt potential to the end of its emitter resistor 42 and of the 0 volt potential to the end of its bias resistor 45. The by-pass diode 46 is inhibited since it is reverse biassed.

Conversely, when ground OB is applied to the terminal D and the −48 volt potential is applied to the terminal C, the current limiter 30 limits current while the current limiter 40 is inhibited and is by-passed by its by-pass diode 46.

The base potential of the ballast transistor of the current limiter which is actually limiting current is fixed relative to the −48 volt potential by the chain of diodes of its base bias circuit. The current is limited by a suitable choice of the saturation current of the ballast transistor. Said saturation current is adjusted by choosing suitable values for the bias resistor and for the chain of diodes. The emitter resistor improves the quality of the current limitation by a small degree of current negative feed-back.

The saturation current chosen for the ballast transistors is about 30 mA which is the value necessary for remotely powering the subscriber terminal 1 in the steady state. Above such a current, the ballast transistor leaves its saturation range to go towards a linear state where it acts like a current generator. An emitter resistance of about ten or so ohms is chosen to obtain a current limitation value of about 50 mA.

To reduce the transversal current which flows through the bias resistor of the current limiter which is not inhibited, it is advantageous to use a Darlington type transistor as a ballast transistor in which case it is necessary to add an extra diode to the chain of diodes. Said extra diode is illustrated in broken lines in FIG. 3.

In the steady state, i.e. when there is no reversal of the exchange battery terminals on the junctor access 3, the ballast transistor of the current limiter which is limiting the current is saturated so that said current limiter causes only a very small voltage drop in the remote power supply circuit and does not disturb the normal constant voltage remote power supply state. In contrast, during the instants which follow a battery reversal on the junctor access 3, the ballast transistor of the current limiter which is limiting the current is not saturated; it bears the brunt of the 48 volt change and limits the remote power supply current to a value of 50 mA, thus producing a substantially constant current generator.

The low-pass filter 50 has a T configuration with series induction windings and shunt capacitors. This configuration is made symmetrical relative to the two conductors by dividing the coils of the induction windings into two halves, one on each wire and by dividing the shunt capacitors to provide a mid point between them which is connected to exchange battery ground OB. The low-pass filter 50 comprises a second two-port sub-network with one port comprising the wires K and L of the first two-port sub-network and its other port comprising the wires F and G, i.e. one of the ports of the two-port interference-limiting network as a whole. Said wires F and G are connected to the terminals A and B of the low-pass filter 14.

The connection of the mid point of the capacitor branch in the filter 50 to exchange battery ground OB of the storage battery which remote supplies the subscriber terminals spectacularly improves the reduction of the interferences caused in the super-audio channel by signalling, dialling and calling signals on the audio channel. This seems to be due to the fact that by means of this channel, the input to the filter 50 in combination with the current limiters 30 and 40 acts as an RC filter at the frequencies of the super-audio channel.

I claim:

1. An interference-limiting two-port network for use in a 1+1 type transmission system connecting two subscriber terminals via a common two-wire link to a telephone exchange provided with an exchange battery, one of the subscriber terminals being connected via a channel referred to as an audio channel using base band transmission over the common two-wire link and being remotely powered by the exchange battery via said two-wire link, the other subscriber terminal being connected via a channel refered to as a super-audio channel using frequency transposed bands for transmission over the common two-wire link, the audio and super-audio channels being superimposed on the common two-wire link and being separated at the ends of said link by separation filters, each of which includes a low pass filter connecting the common two-wire link to a two-wire line on which the audio channel is isolated, wherein said interference-limiting two-port network is located at the exchange end of the system and comprises two current limiter circuits, each placed in series in a respective one of the two wires of the two-wire line of the audio channel in between the low pass filter of the exchange end separation filter and the rest of the exchange.

2. A network according to claim 1, wherein each current limiter circuit is a DC current limiter shunted by a by-pass diode.

3. A network according to claim 1, wherein the two current limiters are identical.

4. A network pole according to claim 1, further including an interference-limiting low-pass filter which is inserted in between said two current limiters and said low-pass filter of the separation filter, said interference-limiting low-pass filter including a capacitor branch disposed in shunt across the two wires of the two-wire line and having a mid point connected to the ground of the exchange battery which remotely supplies at least one of said subscriber terminals.

* * * * *